(12) United States Patent
Wei et al.

(10) Patent No.: US 7,200,192 B2
(45) Date of Patent: Apr. 3, 2007

(54) METHOD AND APPARATUS FOR DECODING ORTHOGONAL CODES

(75) Inventors: Lee-Fang Wei, Lincroft, NJ (US);
Wen-Yih Hwang, Tainan (TW);
Bor-Chin Wang, Tainan (TW);
Yuh-Ren Jauh, Taoyuan Hsien (TW)

(73) Assignee: Zydas Technology Corporation, Saratoga, CA (US)

( * ) Notice: Subject to any disclaimer, the term of this patent is extended or adjusted under 35 U.S.C. 154(b) by 702 days.

(21) Appl. No.: 10/329,864

(22) Filed: Dec. 26, 2002

(65) Prior Publication Data

US 2004/0125884 A1    Jul. 1, 2004

(51) Int. Cl.
*H03D 1/00* (2006.01)
*H04B 1/10* (2006.01)
*H03K 5/159* (2006.01)
*H03M 13/03* (2006.01)

(52) U.S. Cl. .................. 375/341; 375/346; 375/232; 714/792

(58) Field of Classification Search ............... 375/130, 375/150, 140–142, 147, 148, 229, 232, 233, 375/265, 259–261, 285, 316, 340, 341, 346, 375/350; 714/792, 794, 796, 780, 786, 746, 714/699, 752
See application file for complete search history.

(56) References Cited

U.S. PATENT DOCUMENTS

| 4,631,735 | A | * | 12/1986 | Qureshi | ............. | 375/254 |
|---|---|---|---|---|---|---|
| 6,151,370 | A | | 11/2000 | Wei | ............. | 375/341 |
| 6,177,951 | B1 | * | 1/2001 | Ghosh | ............. | 348/21 |
| 6,233,273 | B1 | * | 5/2001 | Webster et al. | ............. | 375/148 |
| 6,304,618 | B1 | * | 10/2001 | Hafeez et al. | ............. | 375/341 |
| 6,603,801 | B1 | * | 8/2003 | Andren et al. | ............. | 375/147 |
| 7,017,104 | B1 | * | 3/2006 | Chen et al. | ............. | 714/796 |
| 2002/0037059 | A1 | * | 3/2002 | Heegard et al. | ............. | 375/341 |
| 2003/0123585 | A1 | * | 7/2003 | Yen | ............. | 375/350 |
| 2003/0152176 | A1 | * | 8/2003 | Ghosh | ............. | 375/350 |

OTHER PUBLICATIONS

Robert L. Frank, "Polyphase Complementary Codes," IEEE Trans. On Information Theory, pp. 641-647, Nov. 1980.
IEEE Standard 802.11b, "Wireless LAN Medium Access Control (MAC) and Physical Layer (PHY) Specifications: Higher-Speed Physical Layer Extension in the 2.4 GHz Band," Sep. 1999.
Richard van Nee, et al., "New High-Rate Wireless LAN Standards," IEEE Communications Magazine, pp. 82-88, Dec. 1999.
Intersil, "Complementary Code Keying Made Simple," Application Note AN9850.2, Nov. 2001.

* cited by examiner

*Primary Examiner*—Tesfaldet Bocure
*Assistant Examiner*—Vineeta Panwalkar
(74) *Attorney, Agent, or Firm*—Rosenberg, Klein & Lee

(57) ABSTRACT

An approach for decoding a substantially orthogonal code, such as a CCK code, based on its trellis diagram is provided. Compared to the conventional decoder based on codeword correlation, the unconventional decoder here has the advantage that it can work together with a decision feedback equalizer without suffering from the error propagation effect of the equalizer. In other words, the unconventional decoder makes joint decision feedback equalizer and decoder workable, which in turn enables reliable transmission of a signal encoded by a substantially orthogonal code over a multipath channel.

22 Claims, 6 Drawing Sheets

METHOD AND APPARATUS FOR DECODING ORTHOGONAL CODES

FIELD OF THE INVENTION

The present invention generally relates to a method and apparatus for decoding substantially orthogonal (i.e., orthogonal or nearly orthogonal) codes, such as CCK (complementary code keying) codes.

BACKGROUND OF THE INVENTION

Substantially orthogonal codes, such as the CCK codes used in IEEE standard 802.11b on wireless local area networks, are a class of channel codes that exhibit good auto-correlation and cross-correlation properties. In this type of code, the auto-correlation function of each codeword has a peak amplitude at zero-shift, and a small amplitude at other shifts. The cross-correlation function between different codewords has a small amplitude at all shifts. Because of those nice properties, decoding for this type of code has always been done through codeword correlation.

FIG. 1 shows a block diagram for a prior-art communication system 100 with a CCK code and with such a conventional decoder that is based on codeword correlation. In the transmitter of system 100, the input data are first encoded by CCK encoder 101 to become a sequence of symbols, $\{P_n\}$. Each symbol, $P_n$, is typically selected from a two-dimensional signal constellation. The symbol is then used to modulate the in-phase and quadrature-phase amplitudes of a single carrier through modulator 103 in the usual way and transmitted to multi-path channel 105 in the $n^{th}$ signaling interval, each interval being T seconds long. Two examples for the CCK code are those used in IEEE standard 802.11b on the wireless local area network.

In the first example, encoder 101 takes in 8 data bits each time and uses them to select a codeword, $(C_0, C_1, C_2, C_3, C_4, C_5, C_6, C_7)$, from a codebook with 256 (=$2^8$) codewords, where each $C_i$, i=0, 1, ..., or 7, is a symbol of a 4-PSK signal constellation. The eight symbols, $C_0, C_1, \ldots$, and $C_7$, of the selected codeword are then used by modulator 103 (as $P_n, P_{n+1}, \ldots$, and $P_{n+7}$ for some n in FIG. 1) and transmitted to channel 105 in eight successive signaling intervals. When the four symbols of the 4-PSK are specified by $e^{j\pi/4}, e^{j3\pi/4}, e^{j5\pi/4}$, and $e^{j7\pi/4}$ (that is, when the X and Y coordinates of the four symbols of the 4-PSK are specified by the real and imaginary parts of the complex numbers, $e^{j\pi/4}, e^{j3\pi/4}, e^{j5\pi/4}$, and $e^{j7\pi/4}$, respectively), the codebook of 256 codewords is given by the set, $\{e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}, e^{j(\phi_1+\phi_3)}, -e^{j(\phi_1+\phi_2)}, e^{j\phi_1}\}$, where $\phi_1 \in \{\pi/4, 3\pi/4, 5\pi/4, 7\pi/4\}$, and $\phi_2, \phi_3$, and $\phi_4 \in \{0, \pi/2, \pi, 3\pi/2\}$.

In the second example, encoder 101 takes in only 4 data bits each time and uses them to select a codeword, $(C_0, C_1, \ldots, C_7)$, from a codebook with 16 (=$2^4$) codewords, where each $C_i$, i=0, 1, ..., or 7, is again a symbol of a 4-PSK signal constellation. The codebook in this case is given by the set, $\{(e^{j(\phi_1+\phi_2+\phi_4)}, e^{j(\phi_1+\phi_4)}, e^{j(\phi_1+\phi_2+\phi_4)}, -e^{j(\phi_1+\phi_4)}, e^{j(\phi_1+\phi_2)}, e^{j\phi_1+}, -e^{j(\phi_1+\phi_2)}, e^{j\phi_1})\}$, where $\phi_1 \in \{\pi/4, 3\pi/4, 5\pi/4, 7\pi/4\}, \phi_2 \in \{\pi/2, 3\pi/2\}$, and $\phi_4 \in \{0, \pi\}$.

Each of the two codebooks above is constructed so that its different codewords are nearly orthogonal to each other. Before the present invention, this orthogonal property of the CCK code has been invariably used for its decoding, as discussed below. With a signaling rate 1/T of 11 M symbols per second, the CCK codes in the first and second examples above can be used to transmit data at 11 and 5.5 Mbps, respectively. For convenience, they are referred to hereinafter as the 11- and 5.5-Mbps CCK codes.

In the receiver of system 100, the received signal r(t) is first processed by demodulator 107, whose output is a sequence of channel-impaired symbols, $\{\tilde{P}_n\}$. Note that the output of demodulator 107 may be sampled at a rate higher than the signaling rate 1/T. For easy discussion, that output is sampled at the signaling rate here and in the detailed description below. The impairments typically include additive noise and intersymbol interference (ISI) that is caused by multi-path channel 105. When the ISI is not severe, conventional CCK decoder 111 can be applied directly to the channel-impaired symbols $\{\tilde{P}_n\}$ to recover each transmitted codeword, $(C_0, C_1, \ldots, C_7)$, and its associated input data.

Conventional CCK decoder 111 is based on codeword correlation, which is in turn based on the orthogonal property of the CCK code. Roughly speaking, in decoder 111, a bank of correlators, each being associated with a codeword of the CCK code, are applied to each channel-impaired received codeword, $(\tilde{C}_0, \tilde{C}_1, \ldots, \tilde{C}_7)$, which is $(\tilde{P}_n, \tilde{P}_{n+}, \ldots \tilde{P}_{n+7})$ for some n. The codeword whose correlator has the largest output is then decided to be the transmitted codeword.

When standard 802.11b was first established, it was thought that CCK decoder 111 could handle the ISI of channel 105 by itself. However, as the ISI got worse, it was found that CCK decoder 111 alone was not sufficient and an equalizer was needed. In the worse case, a decision feedback equalizer (DFE) was necessary.

FIG. 1 shows perhaps the most advanced receiver, before the present invention, that uses a DFE to receive a CCK-encoded signal. In this receiver, each received channel-impaired symbol, $\tilde{P}_n$, is first passed through traditional feedforward equalizer 109 to become $Q_n$, (shown as $Q_{12}$ for n=12 in FIG. 1). Feedforward equalizer 109 is typically meant to remove the ISI from the future transmitted symbols, $P_{n+1}, P_{n+2}$, and so on, that is contained in $\tilde{P}_n$.

Feedback equalizer 113 is then used to remove the ISI from the past transmitted symbols, $P_{n-1}, P_{n-2}$, and so on, that is contained in $Q_n$. The resulting received signal sample, $R_n$ (shown as $R_{12}$ for n=12 in FIG. 1), which is ideally ISI-free, is then sent to both of conventional CCK decoder 111 and tentative decision maker 115 for further processing. Conventional CCK decoder 111 that is based on codeword correlation operates in the same way as before. It first uses a bank of correlators to operate on the eight received signal samples, $R_n, R_{n+1}, \ldots$, and $R_{n+7}$ for some n, that correspond to a transmitted codeword. It next makes final decisions on all the eight symbols, $P_n, P_{n+1}, \ldots$, and $P_{n+7}$, of the transmitted codeword simultaneously. Those final decisions are then sent to feedback equalizer 113 to remove the ISI of the past symbols, $P_n, P_{n+1}, \ldots$, and $P_{n+7}$, that is contained in $Q_{n+8}, Q_{n+9}$ and so on.

Note, however, that the final decisions on the first seven symbols, $P_n, P_{n+1}, \ldots$ and $P_{n+6}$, of the codeword are not available to feedback equalizer 113 until the signal sample $R_{n+7}$ is received by CCK decoder 111. In other words, not all the final decisions on the past symbols are available to feedback equalizer 113 when one wants to remove their ISI that is contained in $Q_{n+1}, Q_{n+2}, \ldots$, or $Q_{n+7}$. This creates a chicken-egg problem. To obtain the ideally ISI-free received signal samples, $R_{n+1}, R_{n+2}, \ldots$ and $R_{n+7}$, one needs to get first reliable final decisions on $P_n, P_{n+1}, \ldots$, and $P_{n+6}$. However, to obtain those reliable final decisions on $P_n, P_{n+1}, \ldots$, and $P_{n+6}$, one needs to get first those ideally ISI-free received signal samples, $R_{n+1}, R_{n+2}, \ldots$ and $R_{n+7}$.

To solve this chicken-egg problem, tentative decision maker 115 is used to provide tentative decisions on the past transmitted symbols, $P_{n-1}$, $P_{n-2}$, and so on, to feedback equalizer 113 when the final decisions on those symbols are not available from CCK decoder 111. For example, assume that the first transmitted codeword is $(P_0, P_1, \ldots, P_7)$, and the second transmitted codeword is $(P_8, P_9, \ldots, P_{15})$. Referring to FIG. 1, in the $12^{th}$ signaling interval (i.e., n=12), the final decisions on all the eight symbols of the first codeword are available from CCK decoder 111. Those final decisions, designated as $P_0^{(f)}, P_1^{(f)}, \ldots$, and $P_7^{(f)}$, are sent to feedback equalizer 113. However, the final decisions on the past symbols, $P_8, P_9, \ldots, P_{11}$, of the second codeword are not yet available from CCK decoder 111. In this case, tentative decision maker 115 will provide tentative decisions, designated as $P_8^{(t)}, P_9^{(t)}, \ldots$, and $P_{11}^{(t)}$, on those symbols to feedback equalizer 113.

A simple and popular approach for tentative decision maker 115 operates as follows: In each $n^{th}$ signal interval, it finds the symbol from the signal constellation that is closest to the ideally ISI-free received signal sample, $R_n$. It then uses that symbol as the tentative decision on the current symbol, $P_n$. A problem with this approach is that the tentative decision is much less reliable than the final decision. An error in the tentative decision, $P_n^{(t)}$, will propagate through the feedback equalizer. As a result, instead of removing the ISI of the symbol $P_n$ that is contained in the received signal samples, $Q_{n+1}, Q_{n+2}$, and so on, the error will add more ISI to those received signal samples. This error propagation effect defeats the purpose of using a DFE to remove the intersymbol interference in the received signal and will often make the subsequent operation of CCK decoder 111 useless. That is, once an error is made in a tentative decision, the extra noise added to the following received signal samples, $R_{n+1}, R_{n+2}$, and so on, is often beyond the error correcting capability of CCK decoder 111.

SUMMARY OF THE INVENTION

To solve the above mentioned chicken egg and error propagation problems, FIG. 2 shows a block diagram for a communication system 200 with a joint DFE and decoder in accordance with the present invention. In this diagram, the CCK encoder, modulator, channel, and demodulator are the same as those in FIG. 1. The output of demodulator 107 in system 200 is, however, sent to joint DFE and CCK decoder 201 to recover the transmitted data.

According to the present invention, the CCK decoder here is unconventional and is based on a trellis diagram of the CCK code, instead of the usual codeword correlation. The trellis diagram of the CCK code comprises a plurality of stages of state transitions that starts from an unique beginning state, goes through a plurality of stages of intermediate states, and ends at an unique ending state. Each state transition is associated with a symbol of a signal constellation. The diagram thus defines a number of sequences of state transitions from the unique beginning state to the unique ending state. Each sequence of state transitions is associated with a sequence of symbols. According to the present invention, there is a one-to-one correspondence between the sequences of symbols associated with the trellis diagram and the codewords of the CCK code.

The unconventional CCK decoder of the present invention operates as follows. Before receiving each current symbol, the decoder maintains a plurality of surviving paths, each path comprising a sequence of tentative decisions on the past received symbols. The decoder next uses the information carried by the current received symbol to update those surviving paths. According to the present invention, this updating is based on the stage of trellis diagram that corresponds to the current symbol. A final decision on a past or current received symbol can then be made by tracing back from the best surviving path on a periodical basis.

There are many different ways to select the surviving paths in the unconventional CCK decoder. In a preferred embodiment, the unconventional decoder is path-oriented, where different surviving paths may lead to the same state of a stage of trellis diagram of the CCK code. In another preferred embodiment, the unconventional decoder is state-oriented, where different surviving paths are required to lead to different states of a stage of trellis diagram of the CCK code.

In accordance with the present invention, a major advantage of the unconventional CCK decoder is that it can work together with a DFE to receive a CCK-encoded signal from a multi-path channel, without having the chicken-egg and error propagation problems of the conventional CCK decoder. This is achieved by using a plurality of DFE's, with the decisions on the past received symbols that are needed by a DFE being obtained from a surviving path of the unconventional decoder, and with the output of that DFE being used to extend that surviving path.

The foregoing and other objects, features, aspects and advantages of the present invention will become better understood from a careful reading of a detailed description provided herein below with appropriate reference to the accompanying drawings.

DETAILED DESCRIPTION OF THE INVENTION

Figure 3:
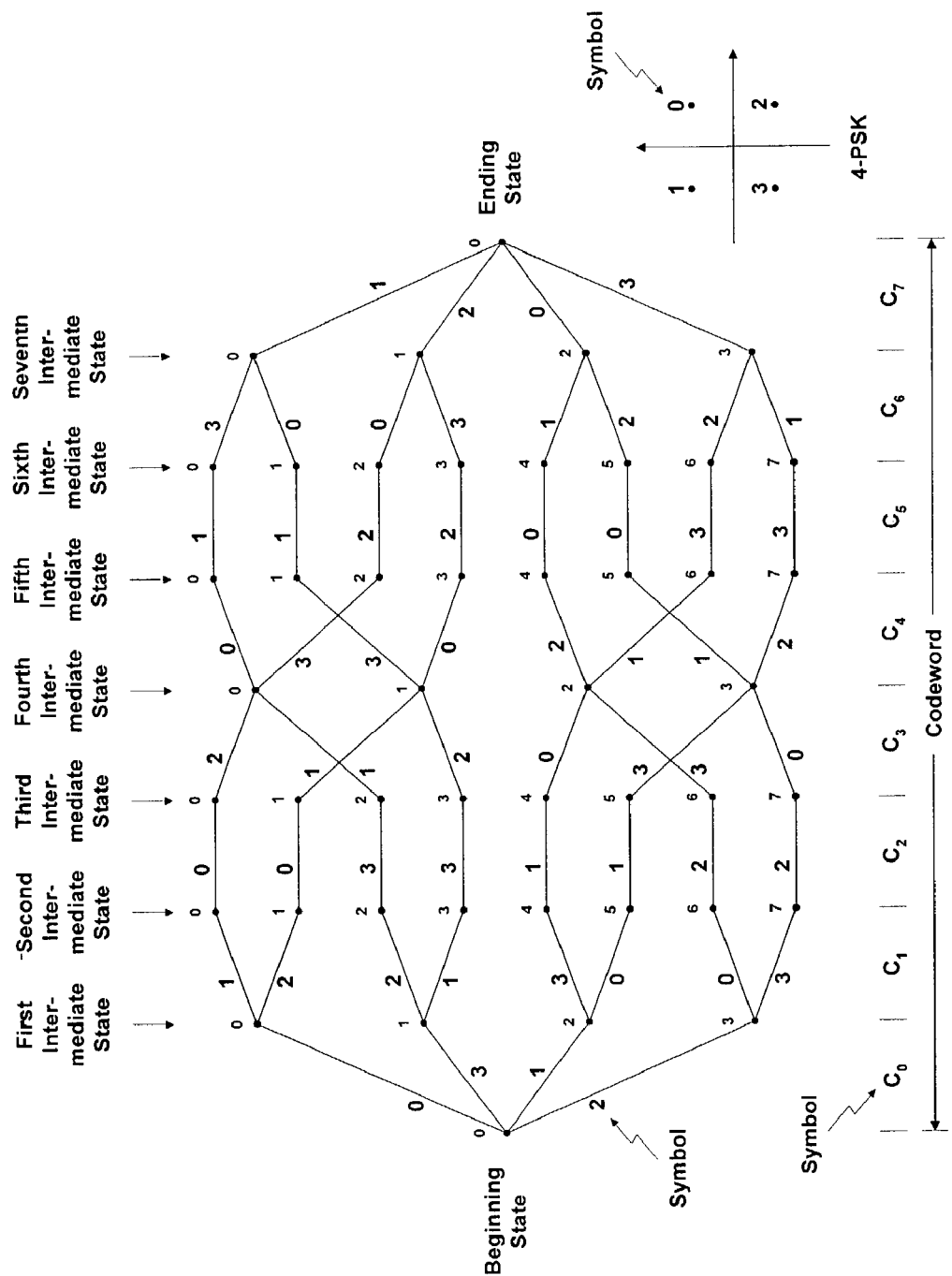
FIG. 3 shows the trellis diagram for the 5.5-Mbps CCK code used in 802.11b according to the present invention.

FIG. 3 shows the trellis diagram for the 5.5-Mbps CCK code used in 802.11b according to the present invention. The trellis diagram comprises eight stages of state transitions from left to right of the figure. In each stage, the code can go from each of its current states to some of its next states. Each state transition is associated with a symbol, 0, 1, 2, or 3 of a 4-PSK constellation. For the first stage, there is only one current state, which is the beginning state 0; and the next states are the first intermediate states. For the $i^{th}$ stage, i=2, 3, ..., or 7, the current states are the i-$1^{th}$ intermediate states and the next states are the $i^{th}$ intermediate states. For the 8 th stage, the current states are the $7^{th}$ intermediate states, and there is only one next state, which is the ending state 0. The numbers of the first, second, third, fourth, fifth, sixth and seventh intermediate states are 4, 8, 8, 4, 8, 8, and 4, respectively. The number of current (or next) states thus varies from stage to stage.

As an example, in the first stage, the code can go from its unique current state 0 to all of its four next states 0, 1, 2, and 3. The symbols associated with those four state transitions are 0, 3, 1, and 2, respectively.

As another example, in the second stage, the code can go from each of its four current states to two of its eight next states. For instance, from current state 0, the code can go to next states 0 and 1. The symbols associated with those two state transitions are 1 and 2, respectively.

The fact that the trellis diagram of FIG. 3 can represent the 5.5-Mbps CCK code can be seen as follows. There are a total of 16 different paths from the beginning state 0 to the ending state 0 in the diagram. Each path comprises eight successive state transitions. Since each state transition is associated with a symbol of the 4-PSK constellation, each path is associated with a sequence of eight symbols, $(C_0, C_1, \ldots, C_7)$, with $C_{i-1}$ designating the symbol associated with the $i^{th}$ state transition of the path, i=1, 2, ..., and 8. For example, one of the 16 paths is the path on the top of the figure, which has all of its seven intermediate states being state 0. The sequence of symbols associated with that path is (0, 1, 0, 2, 0, 1, 3, 1).

It is straightforward to show that the 16 sequences of symbols associated with the 16 different paths here are identical to the 16 codewords of the 5.5-Mbps CCK code. This can be done by simply listing all the 16 codewords of the CCK code and comparing them to the 16 sequences of symbols here. This proves that the trellis diagram of FIG. 3 can represent the 5.5-Mbps CCK code. Once the 5.5-Mbps CCK code is represented by a trellis diagram, many unconventional CCK decoders that are based on this diagram, instead of codeword correlation, can be constructed. As an illustration, an unconventional CCK decoder for additive white Gaussian noise (AWGN) channels may proceed as follows.

Let $(\tilde{C}_0, \tilde{C}_1, \ldots, \tilde{C}_7)$ be a received channel-impaired codeword, which is $(\tilde{P}_n, \tilde{P}_{n+1}, \ldots, \tilde{P}_{n+7})$ for some n. To recover the transmitted codeword, the decoder has eight stages of operations. In the $i^{th}$ stage, i=1, 2, ..., or 8, the decoder processes the received channel-impaired symbol $\tilde{C}_{i-1}$ using the $i^{th}$ stage of state transitions of the trellis diagram (or simply the $i^{th}$ stage trellis diagram) of FIG. 3. In the beginning of the $i^{th}$ stage, the decoder maintains a surviving path and a path metric for each of its current states. The surviving path for a state is the most likely sequence of symbols, $(C_0, C_1, \ldots, C_{i-2})$, that leads to that state. And the path metric for that state is the squared Euclidean distance between that most likely sequence and the received sequence of channel-impaired symbols, $(\tilde{C}_0, \tilde{C}_1, \ldots, \tilde{C}_{i-2})$. In the first stage, there is only one current state, which is the beginning state 0. In this case, the surviving path for the current state is initialized as an empty sequence and its path metric is set at zero.

After the docoder receives the channel-impaired symbol $\tilde{C}_{i-1}$ in the $i^{th}$ stage, it first calculates a branch metric for each of the four symbols of the 4-PSK constellation, which is the squared Euclidean distance between $\tilde{C}_{i-1}$ and that symbol of the constellation. The decoder then updates the surviving path and path metric for each of the next states as follows.

Referring to the $i^{th}$ stage trellis diagram of FIG. 3, for each next state J, it can be reached from certain current states. For each such current state, the decoder adds together the path metric associated with that current state and the branch metric for the symbol associated with the state transition from that current state to the next state J. The decoder then compares all such sums. The smallest sum and its associated sequence of symbols become the path metric and surviving path for the next state J. The associated sequence of symbols here is simply the concatecation of the surviving path for the winning current state and the symbol associated with the winning state transition. At the end of the $8^{th}$ stage, the surviving path associated with the unique next state, which is the ending state 0, is declared to be the most likely transmitted codeword. Once the transmitted codeword is recovered, its associated data bits can be recovered in a straightforward manner in accordance with what was done in the encoder. This decoding process is then repeated for the next received channel-impaired codeword.

Figure 4:
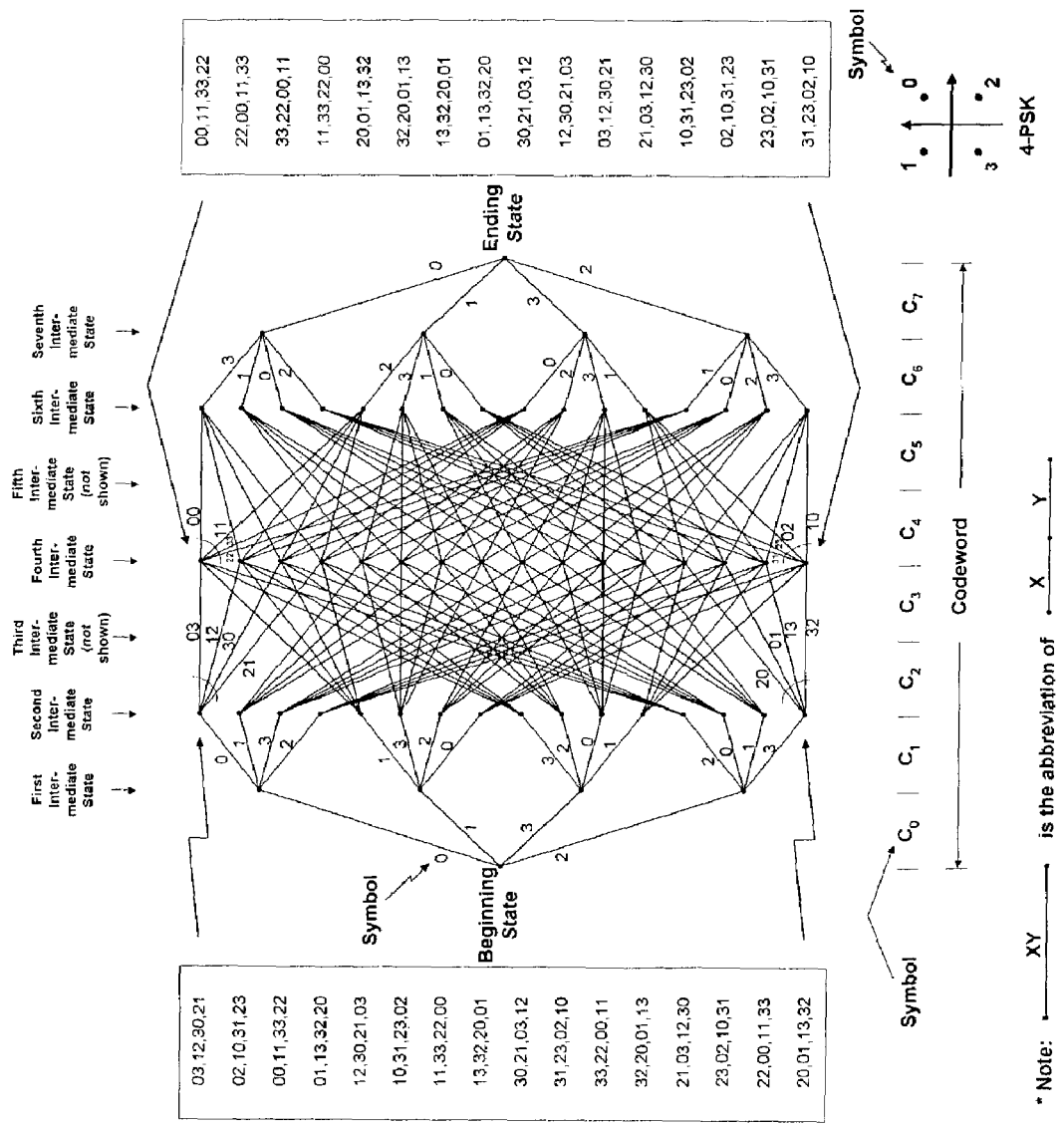
FIG. 4 shows the trellis diagram for the 11-Mbps CCK code used in 802.11b according to the present invention.

FIG. 4 shows the trellis diagram for the 11-Mbps CCK code used in 802.11 b according to the present invention. A fully-blown version of the diagram would again comprise eight stages of state transitions from left to right of the figure. In each stage, the code can go from each of its current states to some of its next states. Each state transition is associated with a symbol, 0, 1, 2, or 3 of a 4-PSK constellation. The diagram has only one beginning and one ending state. The numbers of the first, second, third, fourth, fifth, sixth and seventh intermediate states are 4, 16, 64, 16, 64, 16, and 4, respectively. The number of the current (or next) states thus varies from stage to stage. Since the fully-blown version is too complicated to be shown on the disclosure, several steps have been taken to simplify the diagram:

(1) The states in each stage of the diagram are not numbered.

(2) The 64 third intermediate states are not shown explicitly.

(3) Each pair of successive state transitions from a second to a third, and from that third to a fourth intermediate state is abbreviated as a single state transition from the second to the fourth intermediate state. Each such abbreviated state transition is thus associated with a pair of symbols of the 4-PSK constellation, which are the pair of symbols associated with the original pair of state transitions. This abbreviation should not cause any confusion since each of the 64 third intermediate states can be reached from only one second intermediate state and can go to only one fourth intermediate state.

(4) For clarity, the pairs of symbols associated with all of the abbreviated state transitions from the second to the fourth intermediate states are shown in the box on the left side of FIG. 4. A few pairs of symbols are also shown next to the abbreviated state transitions to indicate the relationship between the pairs of symbols in the box and the abbreviated state transitions. For example, the four pairs of symbols, 03, 12, 30, and 21, on the first line in the box are associated with the four abbreviated state transitions from the first of the 16 second intermediate states to the first, second, third, and fourth of the 16 fourth intermediate state, respectively.

(5) Likewise, the 64 fifth intermediate states are not shown explicitly.

(6) Each pair of successive state transitions from a fourth to a fifth, and from that fifth to a sixth intermediate state is abbreviated as a single state transition from the fourth to the sixth intermediate state. Each such abbreviated state transition is thus associated with a pair of symbols of the 4-PSK constellation, which are the pair of symbols associated with the original pair of state transitions. This abbreviation should again not cause any confusion since each of the 64 fifth intermediate states can be reached from only one fourth intermediate state and can go to only one sixth intermediate state.

(7) For clarity, the pairs of symbols associated with all of the abbreviated state transitions from the fourth to the sixth intermediate states are shown in the box on the right side of FIG. 4. A few pairs of symbols are also shown next to the abbreviated state transitions to indicate the relationship between the pairs of symbols in the box and the abbreviated state transitions.

The fact that the trellis diagram of FIG. 4 can represent the 11-Mbps CCK code can be seen as follows. There are a total of 256 different paths from the beginning state to the ending state in the diagram. Each path comprises eight successive unabbreviated state transitions. Since each unabbreviated state transition is associated with a symbol of the 4-PSK constellation, each path is associated with a sequence of eight symbols, $(C_0, C_1, \ldots, C_7)$, with $C_{i-1}$ designating the symbol associated with the $i^{th}$ state transition of the path, i=1, 2, . . . , and 8. For example, one of the 256 paths is the path on the top of the diagram. The sequence of symbols associated with that path is (0, 0, 0, 3, 0, 0, 3, 0).

It is straightforward to show that the 256 sequences of symbols associated with the 256 different paths here are identical to the 256 codewords of the 11-Mbps CCK code. This can be done by simply listing all the 256 codewords of the CCK code and comparing them to the 256 sequences of symbols here. This proves that the trellis diagram of FIG. 4 can represent the 11-Mbps CCK code.

Just like the 5.5-Mbps CCK code, once the 11-Mbps CCK code is represented by a trellis diagram, many unconventional CCK decoders that are based on this diagram, instead of codeword correlation, can be constructed. As an illustration, an unconventional 11-Mbps CCK decoder for AWGN channels may operate in the same manner as does the unconventional 5.5-Mbps decoder described earlier.

The unconventional CCK decoder is really not meant for AWGN channels. A conventional CCK decoder based on codeword correlation can do equally well for AWGN channels. The goal of representing a CCK code with a trellis diagram and using that diagram to construct an unconventional CCK decoder is to solve the chicken-egg or error propagation problems encountered by conventional CCK decoder 111 when the decoder is used together with a DFE to receive signal from a multi-path channel. The unconventional CCK decoder makes joint DFE and decoder 201 workable, which in turn enables reliable transmission of a CCK-encoded signal over a severe multi-path channel, as discussed next.

Figure 1:
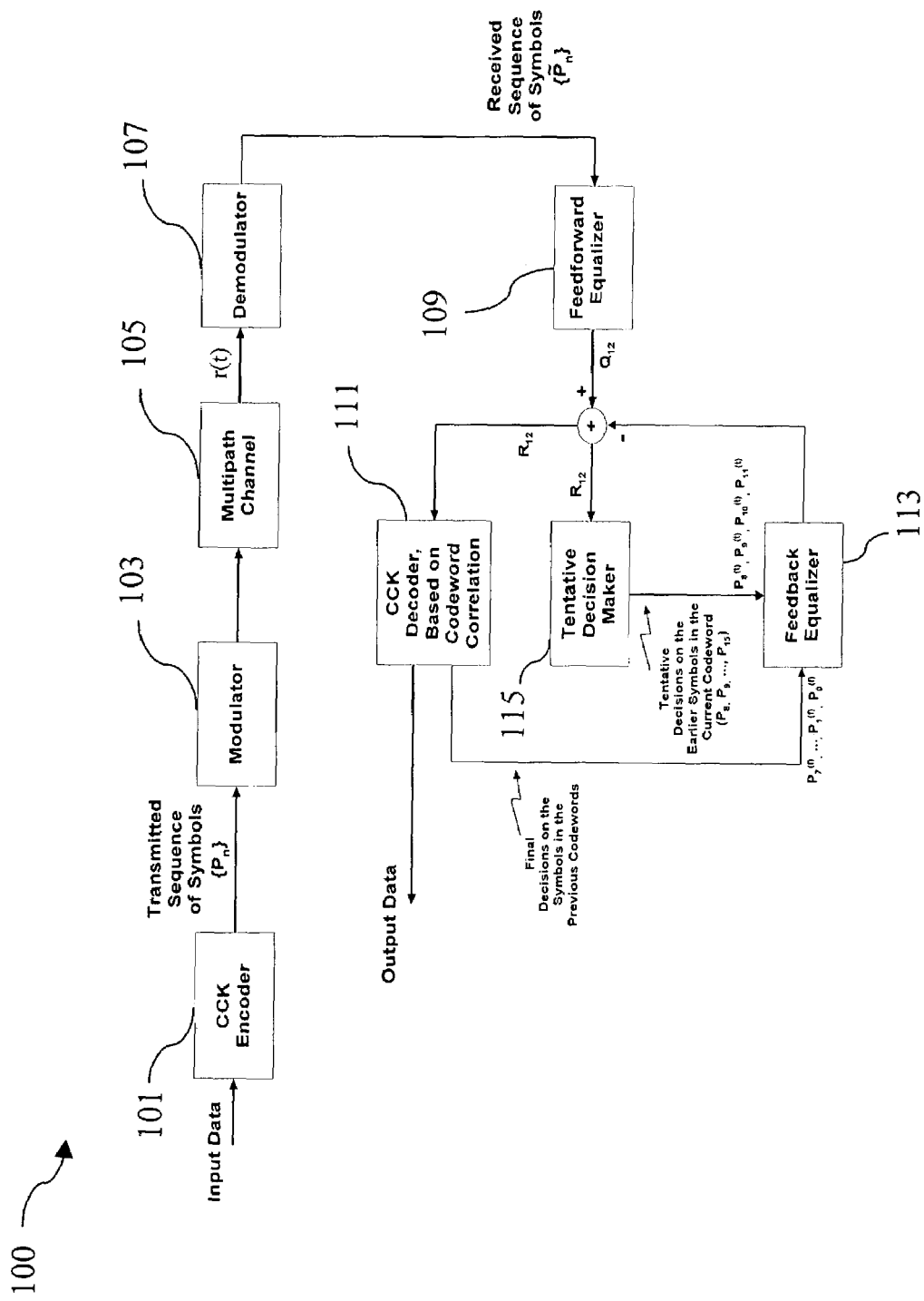
FIG. 1 shows a block diagram for a prior-art communication system with a conventional CCK decoder that is based on codeword correlation.
Figure 2:
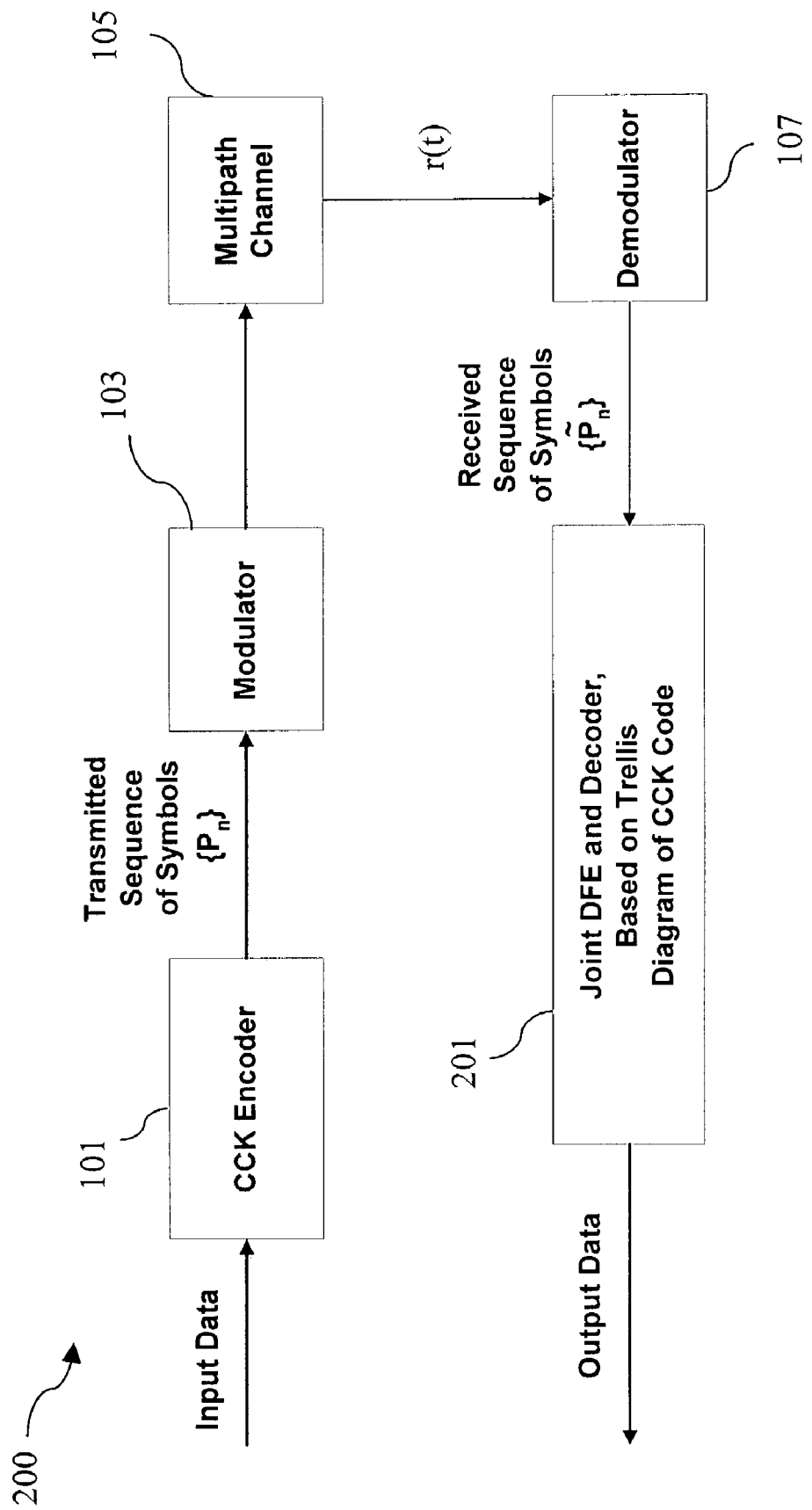
FIG. 2 shows a block diagram for a communication system with a joint DFE and CCK decoder that is based on a trellis diagram of a CCK code according to the present invention.
Figure 5:
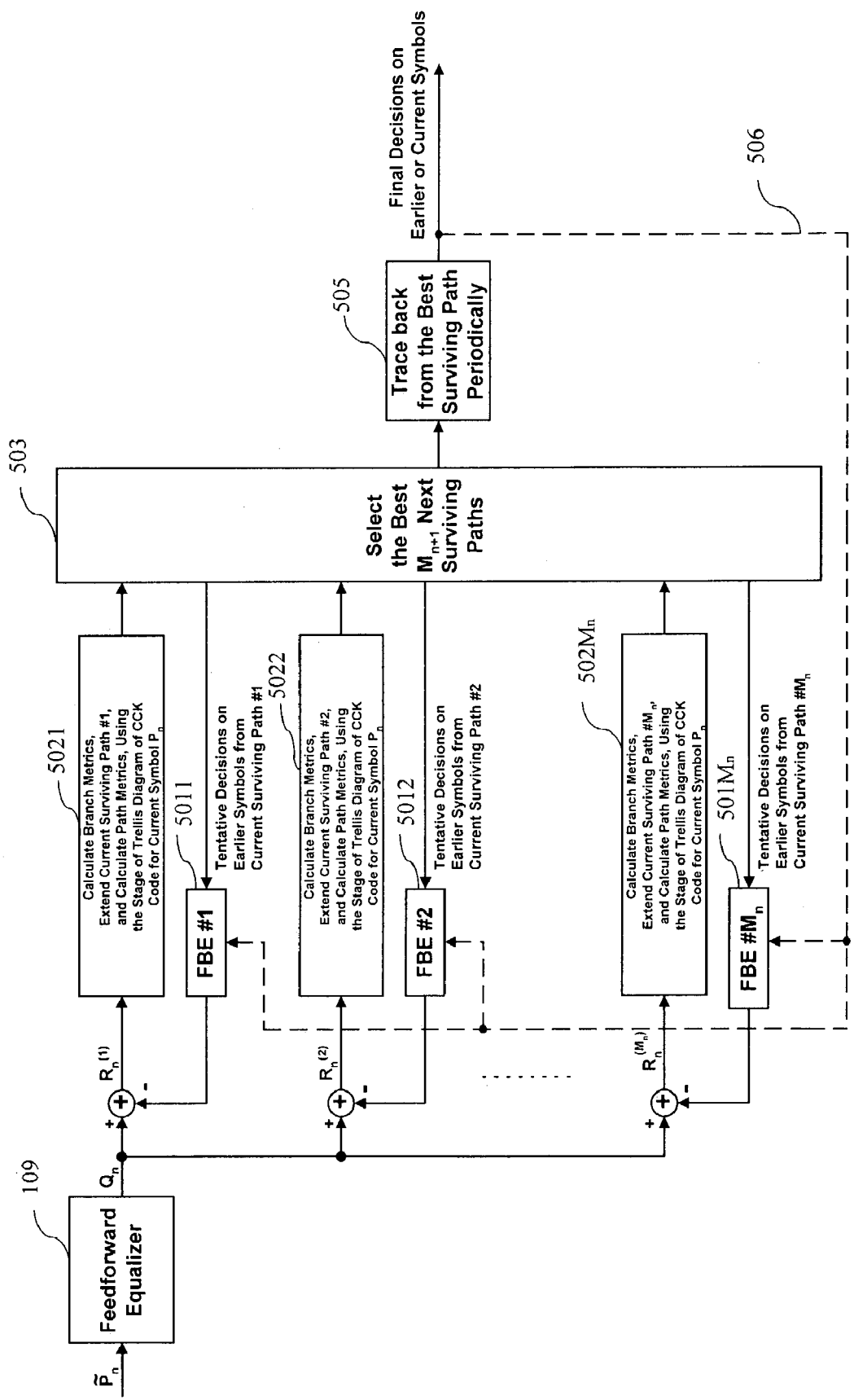
FIG. 5 shows a first embodiment for the joint DFE and CCK decoder of FIG. 2.

FIG. 5 shows a first embodiment for joint DFE and decoder 201 of FIG. 2 that is based on the trellis diagram of a CCK code. The operations of this embodiment proceed as follows. In the beginning of each $n^{th}$ signaling interval, the decoder keeps the best $M_n$ current surviving paths, $M_n$ being a design parameter that depends on many things, including the code, channel, performance requirement, and complexity. $M_n$ may also be a function of n. That is, its value may depend on the position of the symbol $P_n$ in a CCK codeword. Each surviving path comprises a sequence of tentative decisions on the past transmitted symbols, $P_{n-1}, P_{n-2}$, and so on. Each path is also associated with a path metric and a state. The path metric is a distance measure that indicates how good the path is. The state tells which state the path leads to, so that the decoder knows how to extend the path.

Referring to FIG. 5, each received channel-impaired symbol, $\tilde{P}_n$, is first passed through traditional feedforward equalizer 109 to become $Q_n$. Feedforward equalizer 109 is typically meant to remove the ISI from the future transmitted symbols, $P_{n+1}, P_{n+2}$, and so on, that is contained in $\tilde{P}_n$.

For each $J^{th}$ current surviving path, J=1, 2, . . . , or $M_n$ a feedback equalizer FBE #J is then used to remove the ISI from the past transmitted symbols, $P_{n-1}, P_{n-2}$, and so on, that is contained in $Q_n$. The tentative decisions on the past transmitted symbols, $P_{n-1}, P_{n-2}$, and so on, that are needed by the feedback equalizer are provided by the $J^{th}$ current surviving path. Blocks 5011 through 501$M_n$ show this step of processing.

The resulting received signal sample, $R_n^{(j)}$, which is ideally an ISI-free received signal sample for the current transmitted symbol $P_n$, is then used by the decoder to calculate the branch metric for each state transition from the state associated with the $j^{th}$ current surviving path, extend the $J^{th}$ current surviving path along each such state transition to obtain a number of candidate paths, and calculate the path metric for each candidate path, using the stage of the trellis diagram for the current symbol $P_n$ Blocks 502l through 502$M_n$ show this step of processing The candidate paths extended from all of the $M_n$ current surviving paths are then put together. As processed at block 503, the decoder selects the best $M_{n+1}$ next surviving paths from those candidate paths, which are the paths with the smaller path metrics. The decoder can then find the next surviving path with the smallest path metric, and trace back from that path as processed at block 505 to make a final decision on an earlier transmitted symbol, $P_{n-k}$ (or the current transmitted symbol $P_n$ if it is the last symbol of a packet or a CCK codeword). If so desired, this final decision may also be used to substitute the corresponding tentative decision used in each of feedback equalizers 5011 through 501$M_n$ in the next signaling interval, as shown by dotted connection 506. Note that block 505 does not have to make a final decision on an earlier or current transmitted symbol in each signaling interval. It can do that on a periodical basis, with a period longer than a signaling interval.

As an example of the processes in blocks 502l through 502$M_n$ and 503, assume that the 5.5-Mbps CCK code is used. Assume also that the stage of trellis diagram for the current symbol $P_n$ is the second-stage trellis diagram shown in FIG. 3 (which is the stage corresponding to $C_1$ in the figure). Assume further that the $J^{th}$ current surviving path leads to current state 0. There are two state transitions from current state 0 to next states 0 and 1, which are associated with symbols 1 and 2 of the 4-PSK constellation, respectively. The decoder calculates a branch metric for each state transition from current state 0, which is the squared Euclidean distance between $R_n^{(J)}$ and the symbol associated with that state transition. The decoder then extends the $J^{th}$ current surviving path along each state transition to obtain two candidate paths, and calculate their path metrics. Each candidate path is the concatenation of the $J^{th}$ current surviving path and the symbol associated with a state transition from current state 0. The path metric for that candidate path is the sum of the path metric of the $J^{th}$ current surviving path and the branch metric associated with that state transition. The $2M_n$ candidate paths extended from all of the $M_n$ current surviving paths are then put together. The decoder selects the best $M_{n+1}$ next surviving paths from those $2M_n$ candidate paths, which are the paths with the smaller path metrics.

Some specific choices of the parameters in the above embodiment are as follows: The number $M_n$ of current surviving paths can be chosen to be one for those signaling intervals whose symbol $P_n$ is the first symbol of a CCK codeword. For those signaling intervals, there is thus only one current surviving path, which comprises a sequence of final decisions on the past transmitted symbols, $P_{n-1}, P_{n-2}$, and so on, with its path metric being set at zero. The period with which block 505 makes final decisions on the transmitted symbols can be chosen to be the length of a CCK codeword, with its timing of making final decisions being synchronized with the end of each codeword. As a result of these settings, the decoder retains only one surviving path at the end of each codeword. Obviously, the tentative decisions from that unique surviving path become the final decisions on all the symbols of that codeword.

The fact that the joint DFE and unconventional CCK decoder in the above embodiment can solve the error propagation problem of the DFE can be understood as follows: As long as the number $M_n$ of surviving paths, for those signaling intervals whose $P_n$ is not the first symbol of a codeword, is large enough, one of the surviving paths will comprise the correct tentative decisions on all of the past transmitted symbols. Consequently, for that surviving path, the ISI from the past transmitted symbols can be completely removed from the received signal sample, $Q_n$, through the feedback filter, which solves the error propagation problem of the DFE.

The decoder in the first embodiment is referred to as path-oriented, because in selecting the best $M_{n+1}$ next surviving paths, it is not required that those $M_{n+1}$ paths have to lead to $M_{n+1}$ different states. More than one paths can lead to the same state, which is in contrast to the Viterbi decoder or reduced-state Viterbi decoder, as explained below.

Figure 6:
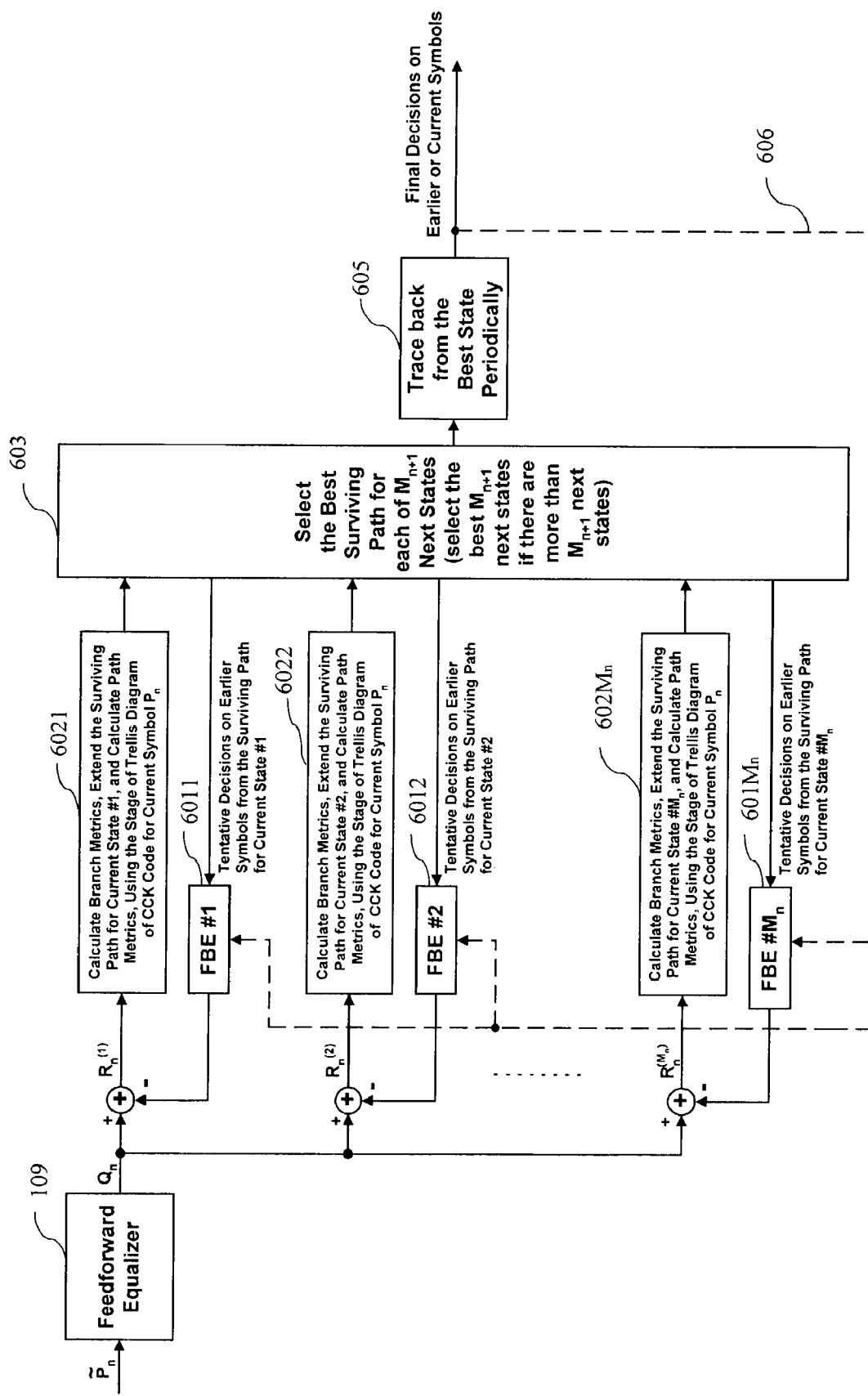
FIG. 6 shows a second embodiment for the joint DFE and CCK decoder of FIG. 2.

FIG. 6 shows a second embodiment for joint DFE and CCK decoder 201 of FIG. 2 that is based on the trellis diagram of a CCK code. A state-oriented decoder is used in this embodiment, which could be a Viterbi decoder or redued-state Viterbi decoder, where each state of the code is associated with at most one surviving path.

When the decoder is a Viterbi decoder, the operations of this second embodiment proceed as follows. In the beginning of each $n^{th}$ signaling interval, the decoder maintains a surviving path and a path metric for each current state in the stage of the trellis diagram for the current symbol $P_n$. Each surviving path comprises a sequence of tentative decisions on the past transmitted symbols, $P_{n-1}$, $P_{n-2}$, and so on. Each path metric is a distance measure that indicates how good its associated path is.

Referring to FIG. 6, each received channel-impaired symbol, $\tilde{P}_n$, is again first passed through traditional feedforward equalizer 109 to become $Q_n$. Feedforward equalizer 109 is typically meant to remove the ISI from the future transmitted symbols, $P_{n+1}$, $P_{n+2}$, and so on, that is contained in $\tilde{P}_n$.

Denote the number of current states as $M_n$, which is a variable that depends on n. For each $J^{th}$ current state, J=1, 2, . . . , or $M_n$, a feedback equalizer FBE #J is then used to remove the ISI from the past transmitted symbols, $P_{n-1}$, $P_{n-2}$, and so on, that is contained in $Q_n$. The tentative decisions on the past transmitted symbols, $P_{n-1}$, $P_{n-2}$, and so on, that are needed by the feedback equalizer are provided by the surviving path associated with the $J^{th}$ current state. This processing is shown at blocks 6011 through $601M_n$.

As in FIG. 5, the resulting received signal sample, $R_n^{(J)}$, which is ideally an ISI-free received signal sample for the current transmitted symbol $P_n$, is then used by the decoder to calculate the branch metric for each state transition from the $J^{th}$ current state, extend the surviving path associated with the $J^{th}$ current state along each such state transition to obtain a number of candidate paths, and calculate the path metric for each candidate path, using the stage of the trellis diagram for the current symbol $P_n$. This processing is shown at blocks 6021 through $602M_n$.

As processed at block 603, for each of the $M_{n+1}$ next states in the stage of the trellis diagram for the current symbol $P_n$, the decoder then compares the path metrics associated with all of the candidate paths that lead to that next state. The candidate path with the smallest path metric becomes the surviving path associated with that next state. The decoder can then find the next state with the smallest path metric, and trace back from the surviving path associated with that next state as processed at block 605 to make a final decision on an earlier transmitted symbol, $P_{n-k}$ (or the current transmitted symbol $P_n$ if it is the last symbol of a packet or a CCK codeword). If so desired, this final decision may also be used to substitute the corresponding tentative decision used in each of feedback equalizers 6011 through $601M_n$ in the next signaling interval, as shown by dotted connection 606. Note that block 605 does not have to make a final decision on an earlier or current transmitted symbol in each signaling interval. It can do that on a periodical basis, with a period longer than a signaling interval. In fact, for a short CCK code such as the 5.5- or 11-Mbps CCK code, a good choice for the period is the length of a CCK codeword, with final decisions on all the symbols of a codeword being made simultaneously at the end of that codeword.

When the parameter, $M_{n+1}$, is chosen to be less than the number of next states for some n, a reduced-state Viterbi decoder is resulted. In that case, block 603 will select a surviving path for each of the best $M_{n+1}$ next states. The best $M_{n+1}$ next states could be, for example, those states whose surviving paths have smaller path metrics.

Although the present invention has been described with reference to the preferred embodiments, it will be understood that the invention is not limited to the details described thereof. Various substitutions and modifications have been suggested in the foregoing description, and others will occur to those of ordinary skill in the art. Specifically, the trellis diagram representation is not limited to the two CCK codes used in IEEE standard 802.11b. The representation can be applied to other CCK codes or other substantially orthogonal codes whose codewords are orthogonal or nearly orthogonal. Although two specific embodiments for the joint DFE and CCK decoder are shown in details, other arrangements that are based on the trellis diagram representation of a substantially orthogonal code are possible. Therefore, all such substitutions and modifications are intended to be embraced within the scope of the invention as defined in the appended claims.

What is claimed is:

1. A method for receiving signal and recovering data from a communication channel, comprising the steps of:
   (a) receiving channel-impaired symbols of a sequence of codewords from said communication channel, said sequence of codewords being generated by applying a substantially orthogonal channel code to said data, each codeword being a sequence of symbols, each symbol being selected from a signal constellation;
   (b) decoding said channel-impaired symbols to recover said data using a decoding process that is based on a trellis diagram; said decoding utilizing a plurality of feedback equalizers to respectively process for each of said channel-impaired symbols a plurality of tentative decisions.

2. The method of claim 1, wherein said substantially orthogonal channel code is a CCK code used in a wireless local area network.

3. The method of claim 1, wherein said trellis diagram has at least two stages of state transitions that start from a beginning state and go through at least one stage of intermediate states before reaching an ending state, each of said state transitions being associated with a symbol of said signal constellation.

4. The method of claim 3, wherein said decoding process further comprises the steps of: maintaining a plurality of surviving paths before processing a current received channel-impaired symbol, each surviving path comprising a sequence of tentative decisions on a plurality of past received channel-impaired symbols; and updating said plurality of surviving paths in accordance with a stage of state transitions corresponding to said current received channel-impaired symbol.

5. The method of claim 1, wherein said communication channel is a multi-path channel.

6. The method of claim 5, wherein said step (b) further includes using a decision on a past received channel-impaired symbol to remove interference on a current received channel-impaired symbol.

7. A method for receiving signal and recovering data from a multi-path channel, comprising the steps of:
(a) receiving channel-impaired symbols of a sequence of codewords from said multi-path channel, said sequence of codewords being generated by applying a substantially orthogonal channel code to said data, each codeword being a sequence of symbols, each symbol being selected from a signal constellation;
(b) using a decision on a past received channel-impaired symbol to remove interference on a current received channel-impaired symbol, said current and past channel-impaired symbols belonging to a same said codeword; and
(c) decoding said channel-impaired symbols to recover said data using a decoding process; wherein said decoding process in said step (c) provides said decision in step (b), and utilizes a plurality of feedback equalizers to respectively process for each of said channel-impaired symbols a plurality of tentative decisions.

8. The method of claim 7, wherein said substantially orthogonal channel code is a CCK code used in a wireless local area network.

9. The method of claim 7, wherein said decoding process maintains a plurality of surviving paths before processing a current received channel-impaired symbol, each surviving path comprising a sequence of tentative decisions on a plurality of past received channel-impaired symbols, a tentative decision of a surviving path being used as said decision in step (b).

10. The method of claim 9, wherein said decoding process is based on a trellis diagram, said trellis diagram having at least two stages of state transitions that start from a beginning state and go through at least one stage of intermediate states before reaching an ending state, each of said state transitions being associated with a symbol of said signal constellation.

11. The method of claim 10, wherein said decoding process updates said plurality of surviving paths in accordance with a stage of state transitions corresponding to said current received channel-impaired symbol.

12. An apparatus for receiving signal and recovering data from a communication channel, comprising:
a receiving unit for receiving channel-impaired symbols of a sequence of codewords from said communication channel, said sequence of codewords being generated by encoding said data in a substantially orthogonal channel encoder, each codeword being a sequence of symbols, each symbol being selected from a signal constellation; and
a decoder for decoding said channel-impaired symbols to recover said data, said decoder being based on a trellis diagram, and utilizing a plurality of feedback equalizers to respectively process for each of said channel-impaired symbols a plurality of tentative decisions.

13. The apparatus of claim 12, wherein said encoder is a CCK encoder used in a wireless local area network.

14. The apparatus of claim 12, wherein said trellis diagram has at least two stages of state transitions that start from a beginning state and go through at least one stage of intermediate states before reaching an ending state, each of said state transitions being associated with a symbol of said signal constellation.

15. The apparatus of claim 14, wherein said decoder maintains a plurality of surviving paths before processing a current received channel-impaired symbol, each surviving path comprising a sequence of tentative decisions on a plurality of past received channel-impaired symbols; and updates said plurality of surviving paths in accordance with a stage of state transitions corresponding to said current received channel-impaired symbol.

16. The apparatus of claim 12, wherein said communication channel is a multi-path channel.

17. The apparatus of claim 16, wherein said decoder further includes at least one decision feedback equalizer that uses a decision on a past received channel-impaired symbol to remove interference on a current received channel-impaired symbol.

18. An apparatus for receiving signal and recovering data from a multi-path channel, comprising:
a receiving unit for receiving channel-impaired symbols of a sequence of codewords from said multi-path channel, said sequence of codewords being generated by encoding said data in a substantially orthogonal channel encoder, each codeword being a sequence of symbols, each symbol being selected from a signal constellation;
plurality of decision feedback equalizers for removing interference on a current received channel-impaired symbol using a decision on a past received channel-impaired symbol, said current and past channel-impaired symbols belonging to a same one of said codewords, said decision feedback equalizers respectively processing for each of said channel-impaired symbols a plurality of tentative decisions; and
a decoder portion for decoding said channel-impaired symbols to recover said data;
wherein said decoder portion provides said decision used by an associated decision feedback equalizer.

19. The apparatus of claim 18, wherein said encoder is a CCK encoder used in a wireless local area network.

20. The apparatus of claim 18, wherein said decoder maintains a plurality of surviving paths before processing a current received channel-impaired symbol, each surviving path comprising a sequence of tentative decisions on a plurality of past received channel-impaired symbols, a tentative decision of a surviving path being used as a decision in an associated equalizer.

21. The apparatus of claim 20, wherein said decoder is based on a trellis diagram, said trellis diagram having at least two stages of state transitions that start from a beginning state and go through at least one stage of intermediate states before reaching an ending state, each of said state transitions being associated with a symbol of said signal constellation.

22. The apparatus of claim 21, wherein said decoder updates said plurality of surviving paths in accordance with a stage of state transitions corresponding to said current received channel-impaired symbol.

* * * * *